(12) United States Patent
Kamiya et al.

(10) Patent No.: US 8,333,477 B2
(45) Date of Patent: Dec. 18, 2012

(54) PROJECTOR HAVING OPERATING PANEL AND INDEPENDENTLY DISPOSED ADJUSTMENT PANEL

(75) Inventors: Manabu Kamiya, Azumino (JP); Akitoshi Kuroda, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 381 days.

(21) Appl. No.: 12/729,484

(22) Filed: Mar. 23, 2010

(65) Prior Publication Data
US 2010/0245785 A1    Sep. 30, 2010

(30) Foreign Application Priority Data

Mar. 24, 2009  (JP) ................................. 2009-071802

(51) Int. Cl.
*G03B 21/14* (2006.01)
(52) U.S. Cl. .............. 353/119; 353/34; 353/69; 353/70; 353/94; 353/122; 362/232
(58) Field of Classification Search .................... 353/31, 353/33–34, 37, 81, 94, 69, 70, 119, 122; 349/5, 7, 8, 9; 362/231, 234
See application file for complete search history.

(56) References Cited

U.S. PATENT DOCUMENTS

| | | | | |
|---|---|---|---|---|
| D436,981 S | * | 1/2001 | Kawasaki et al. | ............ D16/235 |
| 6,345,897 B1 | * | 2/2002 | Furuhata | ....................... 353/122 |
| 6,981,770 B2 | * | 1/2006 | Murai et al. | ..................... 353/61 |
| 7,156,526 B2 | | 1/2007 | Tanaka | |
| 7,165,849 B2 | * | 1/2007 | Masuzawa et al. | ........... 353/101 |
| 7,658,499 B2 | * | 2/2010 | Meng et al. | ..................... 353/101 |
| 7,717,566 B2 | * | 5/2010 | Miyazaki | ........................ 353/33 |
| 2005/0030484 A1 | * | 2/2005 | Kuroda | ............................ 353/57 |
| 2009/0051827 A1 | * | 2/2009 | Yokoyama et al. | ........... 348/744 |

FOREIGN PATENT DOCUMENTS

| | | |
|---|---|---|
| JP | 2002-287252 A | 10/2002 |
| JP | 2007-316173 A | 12/2007 |
| JP | 2008-216757 A | 9/2008 |

* cited by examiner

*Primary Examiner* — Georgia Y Epps
*Assistant Examiner* — Sultan Chowdhury
(74) *Attorney, Agent, or Firm* — AdvantEdge Law Group, LLC

(57) ABSTRACT

A projector includes: an operating panel having a plurality of operating buttons which carry out various operations, is exposed in the external surface of an exterior housing; a projection optical device configured to project an image light into which an incident luminous flux has been modulated in accordance with image information; an image adjustment section configured to change the relative positions of a plurality of lenses configuring the projection optical device; and an image adjustment panel having image adjustment buttons which cause the image adjustment section to operate, wherein the image adjustment panel is disposed in a position independent of the operating panel.

6 Claims, 7 Drawing Sheets

PROJECTOR HAVING OPERATING PANEL AND INDEPENDENTLY DISPOSED ADJUSTMENT PANEL

BACKGROUND

1. Technical Field

The present invention relates to a projector.

2. Related Art

Heretofore, a projector has been known which modulates a luminous flux emitted from a light source in accordance with image information, and projects an image light onto a screen, or the like.

An operating panel on which are disposed a plurality of operating buttons which carry out various operations (a powering on and off, a zoom adjustment, a focus adjustment, and the like) is provided on the top surface side of an exterior housing configuring the exterior of the projector (for example, refer to JP-A-2008-216757).

However, with the projector described in JP-A-2008-216757, a user, when adjusting a projection image projected onto the screen, selects a desired operating button (a focus adjustment button or a zoom adjustment button) from among the plurality of operating buttons on the operating panel, and operates it. At this time, as the user selects a desired operating button from the plurality of operating buttons, there is a problem in that, he or she being likely to mistakenly operate an operating button differing from the desired button, operability is poor.

SUMMARY

An advantage of some aspects of the invention is to provide a projector with which it is possible to improve operability.

A projector according to one aspect of the invention includes an operating panel having a plurality of operating buttons which carry out various operations, is exposed in the external surface of an exterior housing; a projection optical device configured to project an image light into which an incident luminous flux has been modulated in accordance with image information; an image adjustment section configured to change the relative positions of a plurality of lenses configuring the projection optical device; and an image adjustment panel having image adjustment buttons which cause the image adjustment section to operate. The image adjustment panel is disposed in a position independent of the operating panel.

According to the aspect of the invention, as the image adjustment panel which causes the image adjustment section to operate is disposed in a position independent of the operating panel which carries out the various operations, the user, when carrying out, for example, a focus adjustment or a zoom adjustment, does not have to select a desired operating button from the plurality of operating buttons. That is, the user can easily distinguish the image adjustment panel disposed in a position independent of the operating panel, and operate the image adjustment buttons. Consequently, it is possible to improve the operability of the projector.

With the projector according to the aspect of the invention, it is preferable that an opening which opens in one portion of the exterior housing, and exposes the projection optical device is formed in the top surface of the exterior housing, and that the image adjustment panel is disposed in the opening.

However, an adjustment ring which carries out the focus adjustment or zoom adjustment of the projection optical device is exposed by the opening formed in the top surface of the exterior housing. Also, this opening portion is likely to become a dead space in which no other component member is disposed.

According to the aspect of the invention, as the image adjustment panel is disposed in the opening formed in the top surface of the exterior housing, the improvement in operability is achieved while making effective use of the dead space.

A projector according to another aspect of the invention includes an operating panel having a plurality of operating buttons which carry out various operations, is exposed in the external surface of an exterior housing; a projection optical device configured to project an image light into which an incident luminous flux has been modulated in accordance with image information; a projection position adjustment device configured to move the position of a projection image projected from the projection optical device; and a projection position adjustment panel having projection position adjustment buttons which cause the projection position adjustment device to operate. The projection position adjustment panel is disposed in a position independent of the operating panel.

According to the aspect of the invention, as the projection position adjustment panel which causes the projection position adjustment device to operate is disposed in a position independent of the operating panel having the plurality of operating buttons, as heretofore described, the user can distinguish the projection position adjustment panel easily, and operate the projection position adjustment buttons. Consequently, it is possible to improve the operability of the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereafter, a description will be given, based on the drawings, of a first embodiment according to the invention.

Configuration of Projector

Figure 1:
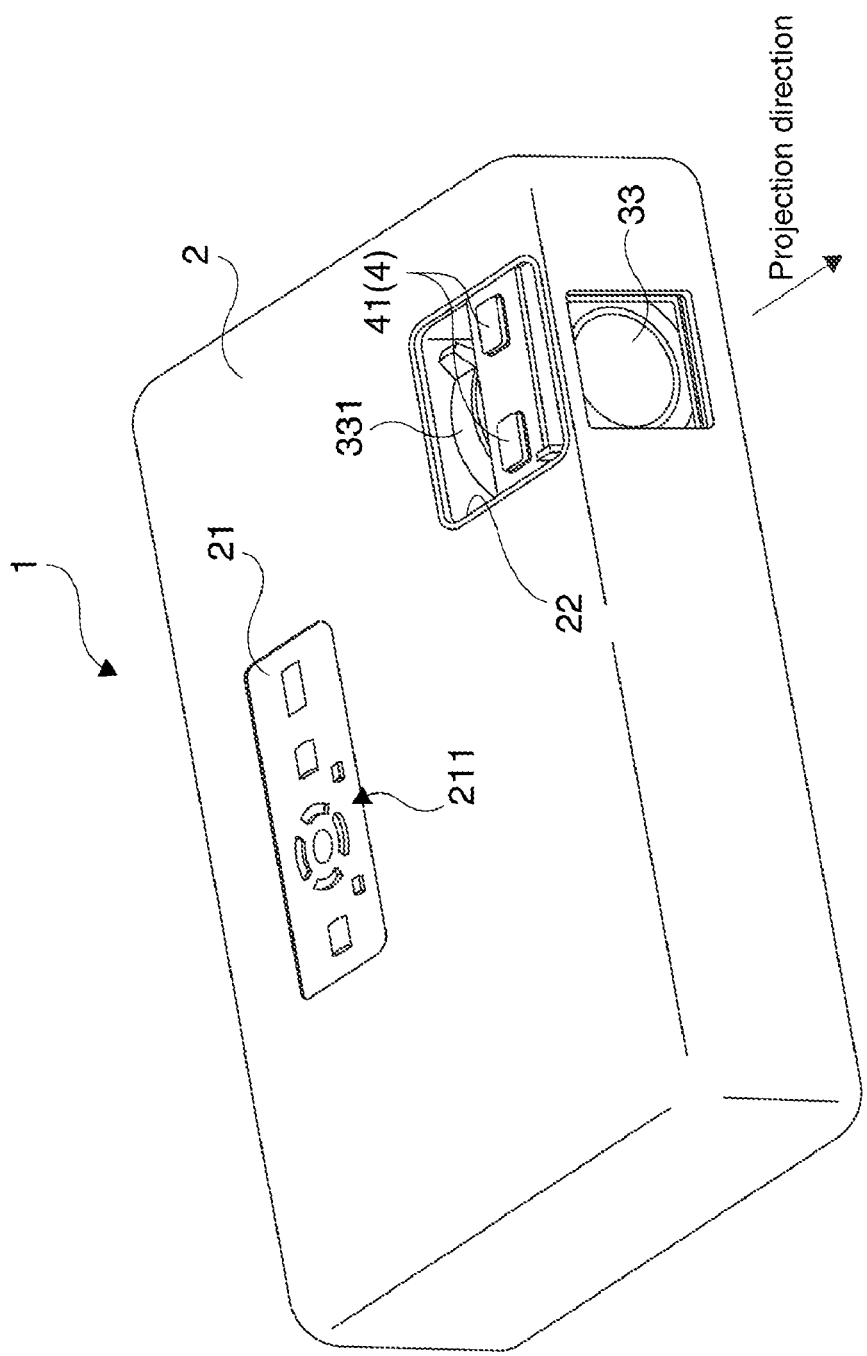
FIG. 1 is a perspective view showing an external configuration of a projector according to a first embodiment of the invention.

FIG. 1 schematically shows an outline configuration of a projector 1 according to the first embodiment.

Figure 2:
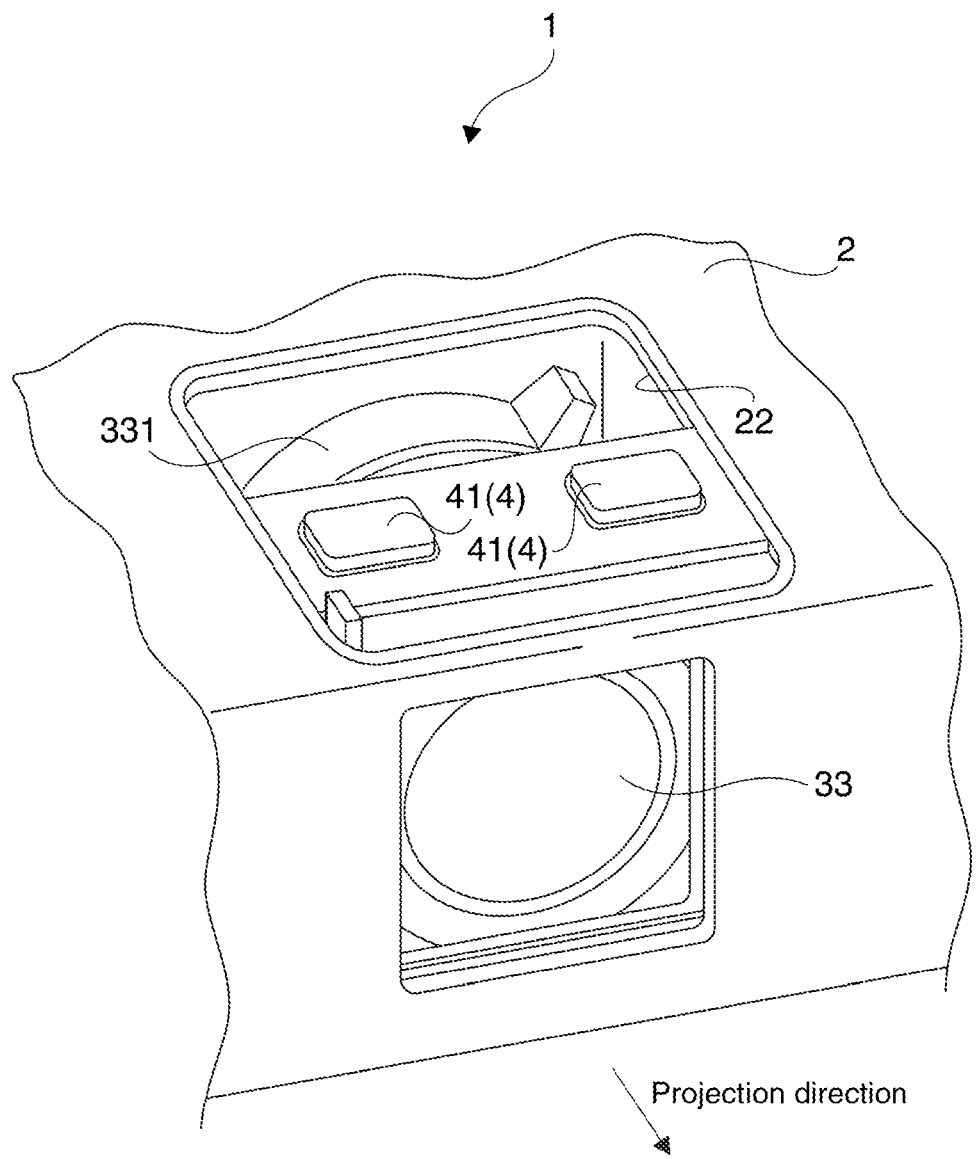
FIG. 2 is a perspective view showing in enlarged dimension a main portion of the projector of the first embodiment.

FIG. 2 is a perspective view showing in enlarged dimension a main portion of the projector 1.

Figure 3:
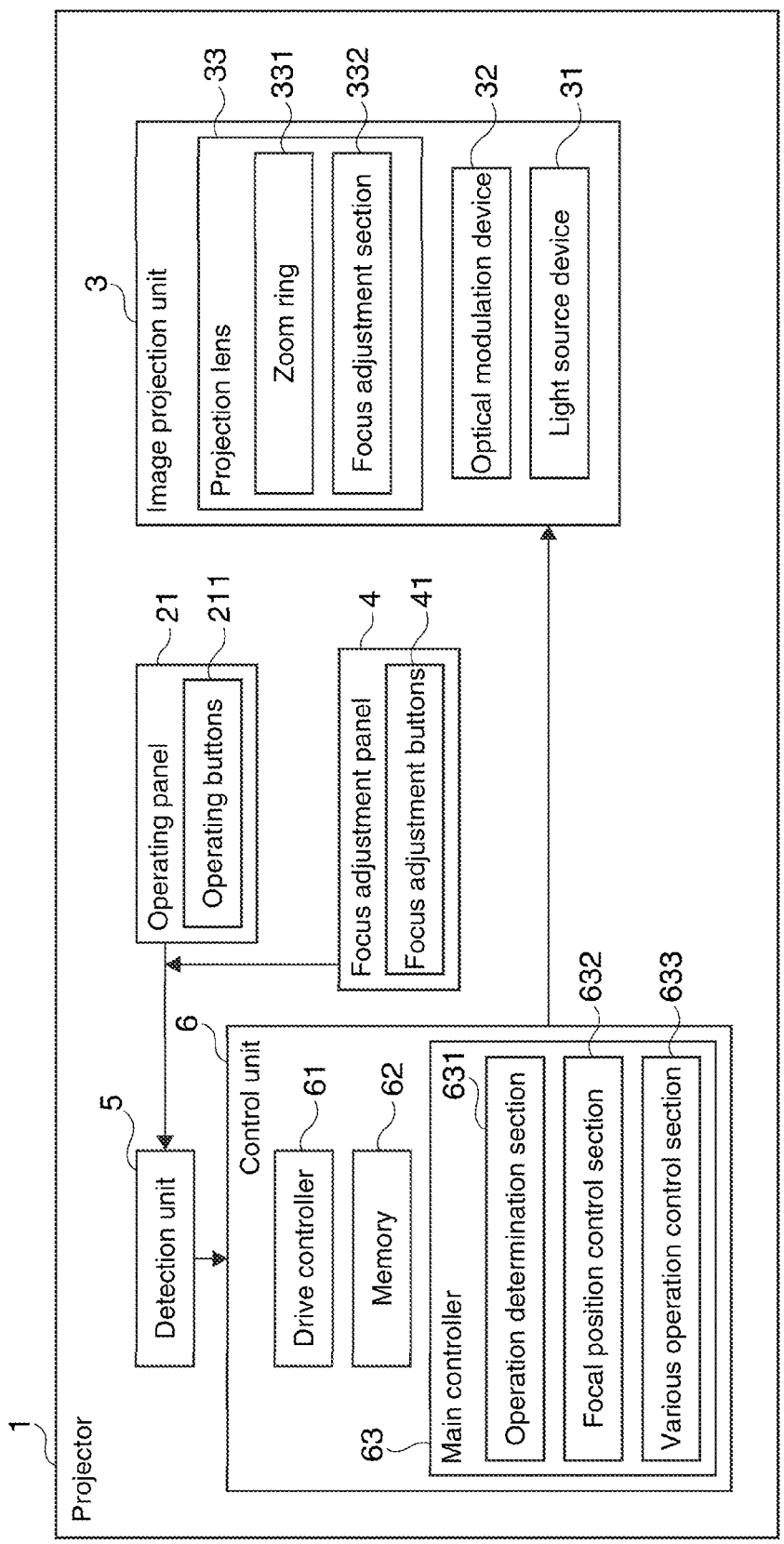
FIG. 3 is a block diagram showing a configuration of the projector.

FIG. 3 is a block diagram showing a configuration of the projector 1.

Hereafter, in the projector 1, a projection side (a side on which a projection lens 33 is disposed) will be taken as a "front", and the opposite side as a "back". Also, a "left" and "right", to be described hereafter, correspond to the left and right when the projector 1 is viewed from the front side with the top surface thereof, to be described hereafter, as the upper side.

The projector 1, which forms an image according to image information, and projects it onto a screen (not shown), includes an exterior housing 2.

The exterior housing 2, having an approximately rectangular parallelepiped shape as a whole, as shown in FIG. 1, is formed of a synthetic resin in the embodiment. The exterior housing 2 is configured of an upper case configuring the top surface, front surface, back surface, and side surfaces of the projector 1, a lower case configuring the bottom surface, front surface, back surface, and side surfaces of the projector 1, and the like.

As shown in FIG. 1, an operating panel 21 including a plurality of operating buttons 211 which carry out various operations of the projector 1 is disposed in a portion of the top surface, nearer the back surface, of the exterior housing 2.

An unshown circuit board is disposed below the operating panel 21. Because of this, by depressing one operating button 211, a signal is input into a switching element mounted on the circuit board, executing a desired operation.

Also, as shown in FIGS. 1 and 2, an opening 22 is formed in the exterior housing 2. As shown in FIG. 2, the opening 22 exposes a zoom ring 331 acting as an image adjustment section which carries out a zoom adjustment of a projection image. Then, a focus adjustment panel 4 acting as an image adjustment panel, to be described hereafter, is disposed on the projection direction side of the opening 22.

Herein, as shown in FIG. 3, the projector 1 includes, apart from the heretofore described operating panel 21, an image projection unit 3, the focus adjustment panel 4, a detection unit 5, and a control unit 6, which are housed in the exterior housing 2.

As shown in FIG. 3, the image projection unit 3 forms and projects an image according to a drive signal acting as an input image signal. The image projection unit 3 includes a light source device 31, an optical modulation device 32, and the projection lens 33 as a projection optical device.

The light source device 31, including a light source lamp, such as a high pressure mercury-vapor lamp, and a reflector which is a reflecting mirror, or a solid light source, such as an LED, although an illustration is omitted, makes a luminous flux incident on the optical modulation device 32.

The optical modulation device 32 is including a liquid crystal panel, which modulates the luminous flux emitted from the light source device 31, forming an image light, and a driver, which drives the liquid crystal panel in accordance with the input drive signal, although an illustration is omitted. The optical modulation device 32, not being limited to the configuration including the liquid crystal panel, may employ a configuration other than liquid crystal, such as, for example, a device using a micromirror.

The projection lens 33 enlarges the image light formed by the optical modulation device 32, and projects it onto a projection surface of the unshown screen. The projection lens 33, being positioned toward the right of the front surface side of the exterior housing 2 as shown in FIG. 1, is configured as a combined lens with a plurality of lenses housed in an unshown tubular lens barrel.

Also, as shown in FIG. 3, the projection lens 33 includes, apart from the heretofore described zoom ring 331, a focus adjustment section 332 as the image adjustment section.

The focus adjustment section 332, being configured of, for example, a pulse motor, under a control by the control unit 6, drives the lenses in the projection lens 33 in such a way that they advance and withdraw along the optical axis of the lens barrel in order to adjust the focal position of the projection image.

The zoom ring 331, being configured so as to be rotatable by hand in a circumferential direction of the lens barrel, rotates, thereby moving the lenses in the lens barrel in a direction of the optical axis. By this means, the relative position of each lens is changed (a zoom condition is changed), implementing the zoom adjustment of the projection image.

The focus adjustment panel 4, being disposed in a portion of the opening 22 nearer the front surface (on a projection direction side), as shown in FIGS. 1 and 2, includes focus adjustment buttons 41 as image adjustment buttons which adjust the focal position of the projection image, as shown in FIGS. 1 to 3.

The focus adjustment buttons 41 being ones which cause the focus adjustment section 332 to operate, an unshown circuit board is disposed below the focus adjustment buttons 41. That is, the circuit board is disposed independently of the heretofore described circuit board of the operating panel 21.

Then, by depressing one focus adjustment button 41, a signal is input into a switching element mounted on the circuit board, driving the focus adjustment section 332. Then, as heretofore described, the lenses in the projection lens 33 advance and withdraw along the optical axis of the lens barrel, adjusting the focal position of the projection image.

As shown in FIG. 3, the detection unit 5 detects a user's operations of the operating panel 21 and focus adjustment panel 4. Then, on the operating panel 21 and focus adjustment panel 4 being operated, the detection unit 5 outputs detection signals to the control unit 6.

The control unit 6, including a main controller 63 configured of a central processing unit (CPU), as shown in FIG. 3, controls the whole of the projector 1 in accordance with a control program stored in a memory 62. As shown in FIG. 3, the control unit 6 includes a drive controller 61, apart from the main controller 63 and memory 62.

The drive controller 61 performs an image processing on the image signal input into the control unit 6 and, as well as outputting a drive signal for the image signal, on which image processing has been performed, to the optical modulation device 32, outputs a control signal which controls a turning on and off of, and a quantity of light emitted from, the light source device 31.

The main controller 63, in accordance with the control program stored in the memory 62, outputs a predetermined control signal to the drive controller 61, causing the drive controller 61 to implement a predetermined process. The main controller 63 includes an operation determination section 631, a focal position control section 632, and a various operation control section 633, as shown in FIG. 3.

With regard to the main controller 63, a description will be given mainly of functions which carry out the operations of the projector 1, and a description of other functions will be omitted.

The operation determination section 631, based on the detection signals input from the detection unit 5, determines whether or not the operating panel 21 and focus adjustment panel 4 have been operated.

On the operation determination section 631 determining that the focus adjustment panel 4 has been operated, the focal position control section 632, based on an amount of operation of one focus adjustment button 41, calculates a focus adjustment amount. Then, a control signal according to a result of the calculation is input into the focus adjustment section 332.

By this means, the focus adjustment section 332, based on the calculated focus adjustment amount, moves the lenses within the lens barrel.

On the operation determination section 631 determining which one of the operating buttons 211 of the operating panel 21 has been operated, the various operation control section 633, in accordance with the type of the operating button 211, outputs an operation signal to a subject component member. For example, when a power button which turns on and off is operated, the various operation control section 633 outputs an operation signal to an unshown power supply device.

Process when Adjusting Focus

Figure 4:
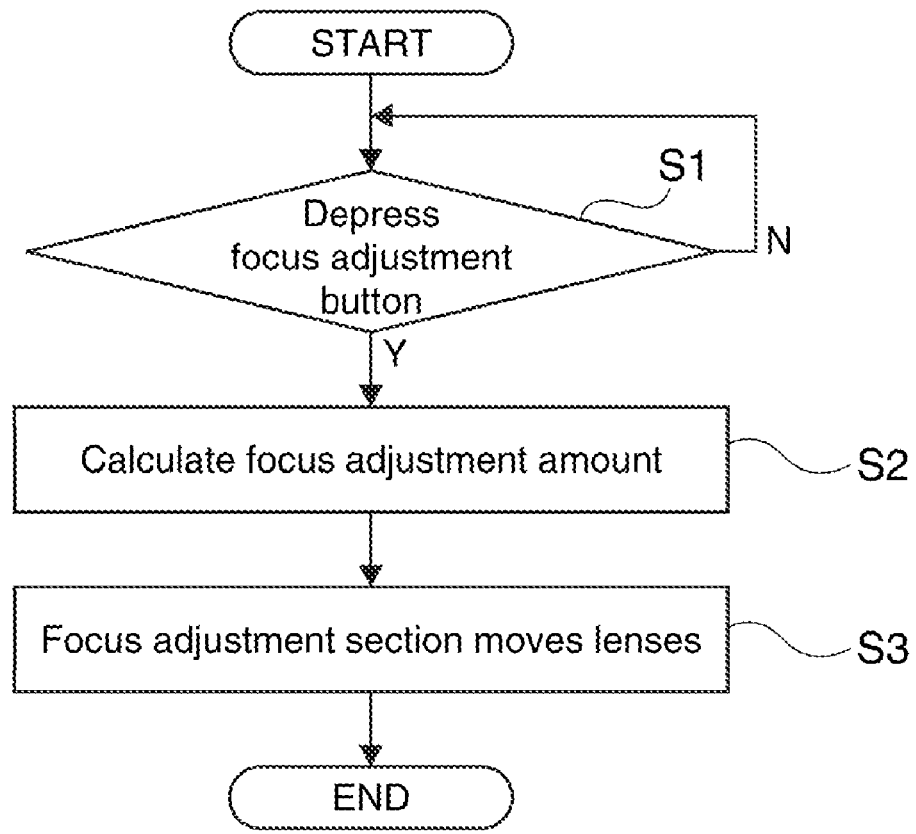
FIG. 4 is a flowchart showing a focus adjustment of the projector.

Next, a description will be given, referring to the flowchart of FIG. 4, of a process of the projector 1 when adjusting focus.

Firstly, on the user operating one focus adjustment button 41 of the focus adjustment panel 4, the detection unit 5 detects the user's operation of the focus adjustment button 41, and outputs a detection signal to the control unit 6. Then, the operation determination section 631, based on the input detection signal, determines whether or not the focus adjustment button 41 has been operated (step S1).

Next, on the operation determination section 631 determining that the focus adjustment button 41 has been operated, the focal position control section 632, based on an amount of operation of the focus adjustment button 41, calculates a focus adjustment amount (step S2).

Then, the focus adjustment section 332, based on the calculated focus adjustment amount, moves the lenses along the lens barrel (step S3).

According to the projector 1 of the heretofore described first embodiment, there are the following advantages.

According to the embodiment, as the focus adjustment panel 4 is disposed in a position independent of the operating panel 21 which carries out the various operations, the user, when carrying out a focus adjustment, does not have to select a desired operating button from the plurality of operating buttons 211. That is, the user can easily distinguish the focus adjustment panel 4 disposed in a position independent of the operating panel 21, and operate the focus adjustment buttons 41. Consequently, it is possible to improve the operability of the projector 1.

Also, the zoom ring 331 which carries out the zoom adjustment of the projection lens 33 is exposed by the opening 22 formed on the top surface side of the projection lens 33. Also, this opening portion is likely to become a dead space in which no other component member is disposed. Therein, as the focus adjustment panel 4 is disposed on the projection direction side of the opening 22 formed on the top surface side of the projection lens 33, the improvement in operability is achieved while making effective use of the dead space.

Second Embodiment

Next, a description will be given, based on the drawings, of a second embodiment of the invention.

Figure 5:
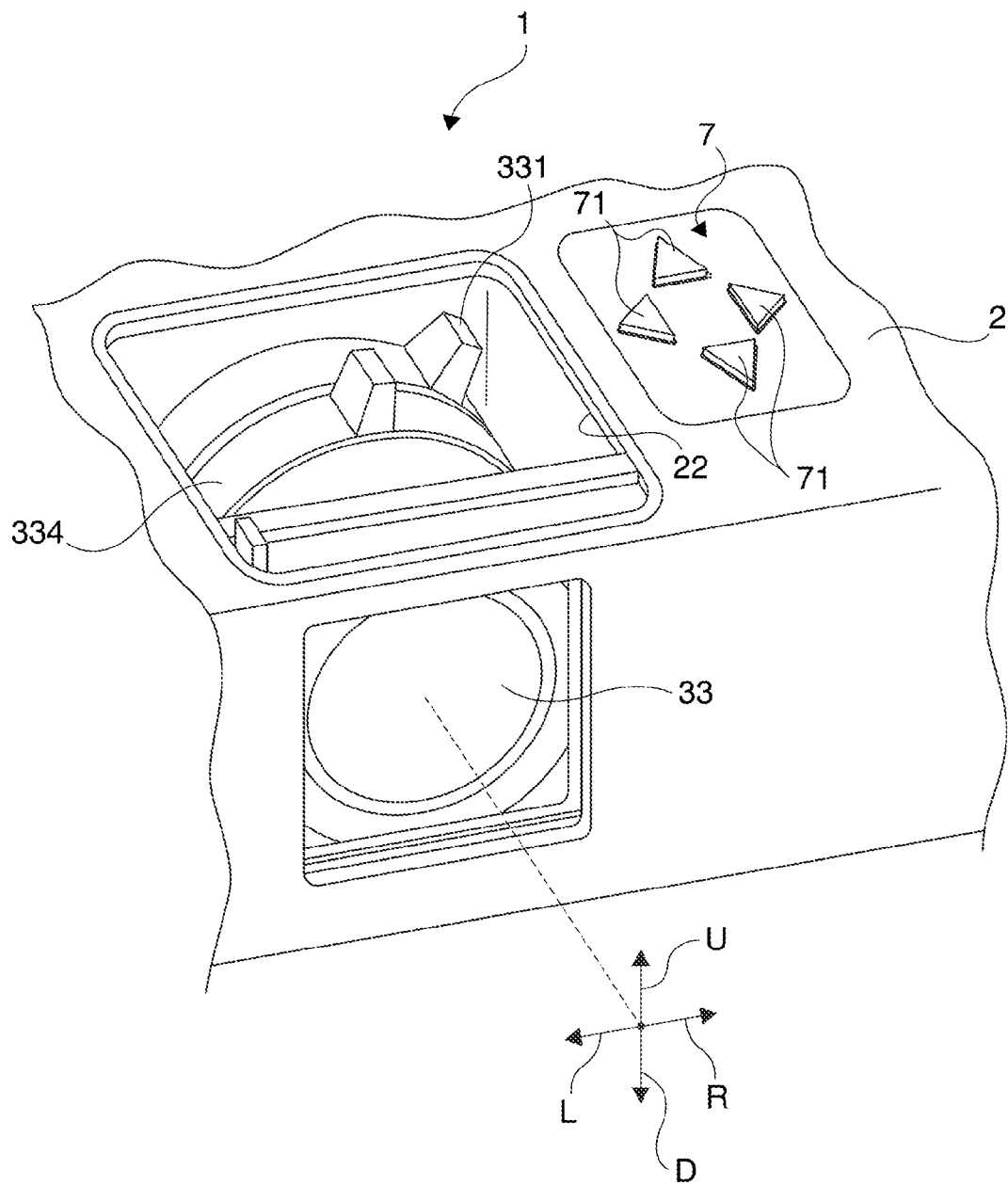
FIG. 5 is a perspective view showing in enlarged dimension a main portion of a projector according to a second embodiment of the invention.

FIG. 5 is a perspective view showing in enlarged dimension a main portion of a projector 1 in the second embodiment.

Figure 6:
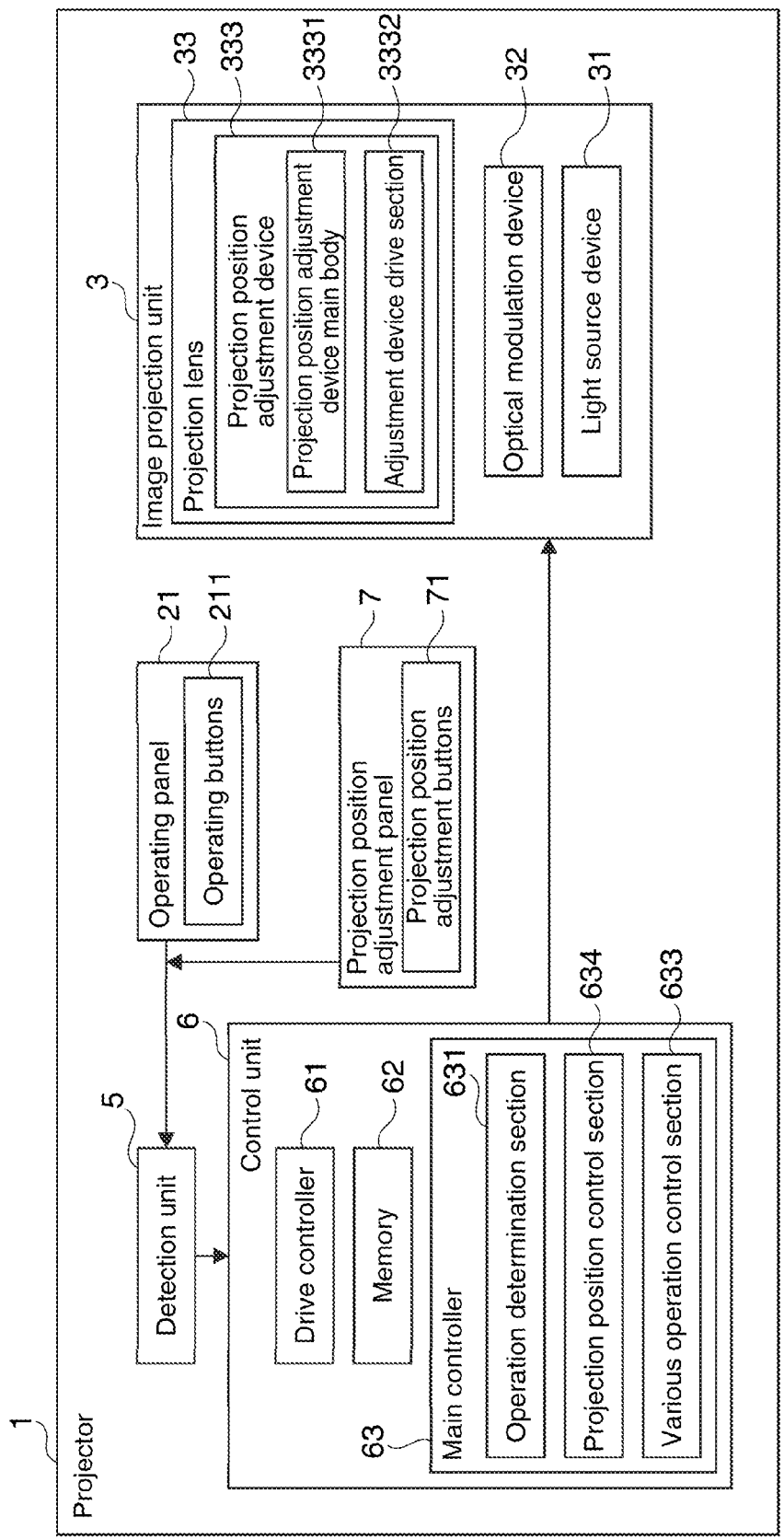
FIG. 6 is a block diagram showing a configuration of the projector.

FIG. 6 is a block diagram showing a configuration of the projector 1.

In the following description, identical characters and numerals will be given to structures similar to, and members identical to, those of the first embodiment, and a detailed description thereof will be omitted or simplified.

In the first embodiment, the circuit board of the focus adjustment panel 4 is disposed independently of the circuit board of the operating panel 21, but the second embodiment differs in that a circuit board of a projection position adjustment panel 7 is disposed independently of the circuit board of the operating panel 21. In the second embodiment, as the focus adjustment panel 4 is not disposed, the zoom ring 331 and a focus ring 334 are exposed by the opening 22.

The projection lens 33 includes a projection position adjustment device 333, as shown in FIG. 6.

The projection position adjustment device 333, supporting the projection lens 33 so that the projection lens 33 can move in a direction perpendicular to the projection direction of the projection lens 33, adjusts the position of the projection image on the unshown screen. The projection position adjustment device 333 includes a projection position adjustment device main body 3331 and an adjustment device drive section 3332, as shown in FIG. 6.

The projection position adjustment device main body 3331 supports the projection lens 33, and moves it in an up-down direction (the direction of arrow U and direction of arrow D shown in FIG. 5), and a left-right direction (the direction of arrow L and direction of arrow R shown in FIG. 5), perpendicular to the projection direction of the projection lens 33, and adjusts the position of the projection image on the screen in the up-down direction and left-right direction.

The adjustment device drive section 3332, being configured of, for example, a pulse motor, drives an unshown drive mechanism of the projection position adjustment device main body 3331 under a control by the control unit 6, moving the position of the projection image on the screen.

As shown in FIG. 5, the projection position adjustment panel 7, being disposed nearer the right side surface in relation to the opening 22 formed in the top surface of the exterior housing 2, includes four projection position adjustment buttons 71.

The projection position adjustment buttons 71 being ones which cause the adjustment device drive section 3332 to operate, an unshown circuit board is disposed below the projection position adjustment buttons 71. That is, the circuit board is disposed independently of the heretofore described circuit board of the operating panel 21.

Then, by depressing one projection position adjustment button 71, a signal is input into a switching element mounted on the circuit board and, as heretofore described, the adjustment device drive section 3332 drives the unshown drive mechanism of the projection position adjustment device main body 3331, moving the position of the projection image on the screen.

The main controller 63 of the control unit 6 includes a projection position control section 634, apart from the heretofore described operation determination section 631 and various operation control section 633.

The operation determination section 631 in the second embodiment, based on detection signals input from the detection unit 5, determines whether or not the operating panel 21 and projection position adjustment panel 7 have been operated. Furthermore, it determines which one of the up, down, left, and right projection position adjustment buttons 71 of the projection position adjustment panel 7 has been operated.

On the operation determination section 631 determining that the projection position adjustment panel 7 has been operated, the projection position control section 634, based on the up, down, left or right direction of the projection position adjustment button 71, outputs a control signal to the adjustment device drive section 3332. By this means, the adjustment device drive section 3332 drives the unshown drive mechanism of the projection position adjustment device main body 3331, moving the position of the projection image on the screen.

Process when Adjusting Projection Position

Figure 7:
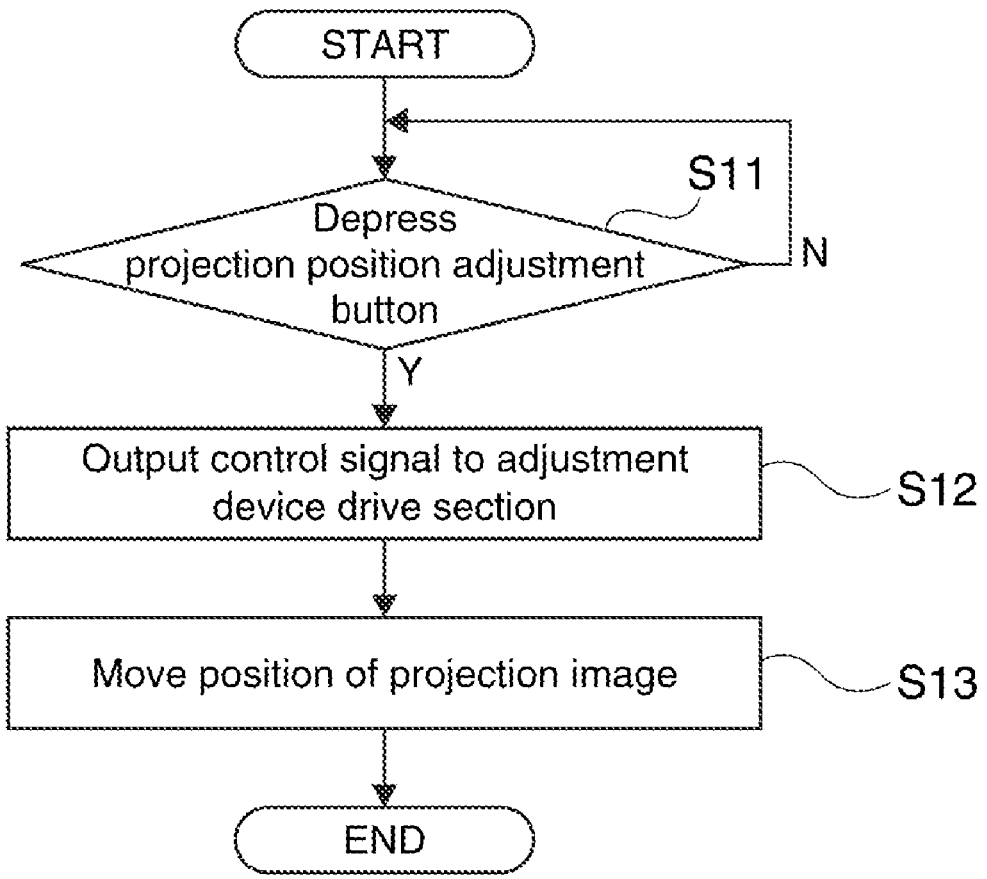
FIG. 7 is a flowchart showing a projection position adjustment of the projector.

Next, a description will be given, referring to the flowchart of FIG. 7, of a projection position adjustment process of the projector 1 of the second embodiment.

Firstly, on the user operating one projection position adjustment button 71 of the projection position adjustment panel 7, the detection unit 5 detects the user's operation of the projection position adjustment button 71, and outputs a detection signal to the control unit 6. Then, the operation determination section 631, based on the input detection signal, determines whether or not the projection position adjustment button 71 has been operated. At this time, it determines which one of the up, down, left, and right projection position adjustment buttons 71 has been operated (step S11).

Next, on the operation determination section 631 determining that the projection position adjustment button 71 has been operated, the projection position control section 634, based on the up, down, left, or right direction of the projection position adjustment button 71, outputs a control signal to the adjustment device drive section 3332 (step S12).

Then, the adjustment device drive section 3332 drives the unshown drive mechanism of the projection position adjustment device main body 3331, moving the position of the projection image on the screen (step S13).

According to the projector 1 of the second embodiment, it is possible to achieve the same advantages as those of the first embodiment.

According to the second embodiment too, as the projection position adjustment panel 7 is disposed in a position independent of the operating panel 21 having the plurality of operating buttons 211, the user can distinguish the projection position adjustment panel 7 easily, and operate the projection position adjustment buttons 71. Consequently, it is possible to improve the operability of the projector 1.

Modifications of Embodiments

The invention not being limited to the previously described embodiments, a modification, an improvement, and the like, within a scope in which it is possible to achieve an advantage of some aspects of the invention, are incorporated in the invention.

In the first embodiment, the focus adjustment panel 4 which drives the focus adjustment section 332 is disposed, but a zoom adjustment panel which adjusts the zoom ring 331 may also be disposed. Also, only either one of them may be disposed.

In each previously described embodiment, one of the focus adjustment panel 4 and projection position adjustment panel 7 is disposed, but they may also be disposed in combination.

The invention can be utilized for a projector used in a presentation or as a home theater.

The present application claim priority from Japanese Patent Application No. 2009-071802 filed on Mar. 24, 2009, which is hereby incorporated by reference in its entirety.

What is claimed is:

1. A projector comprising:
an operating panel having a plurality of operating buttons which carry out various operations, is exposed in the external surface of an exterior housing;
a projection optical device configured to project an image light into which an incident luminous flux has been modulated in accordance with image information;
first and second image adjustment sections configured to change the relative positions of a plurality of lenses configuring the projection optical device; and
an image adjustment panel having image adjustment buttons which cause the first image adjustment section to operate,
wherein:
the second image adjustment section includes a rotatable adjustment ring,
an opening, which opens in one portion of the exterior housing and exposes the rotatable adjustment ring, is formed in the top surface of the exterior housing, and
the image adjustment panel is disposed within the opening in a position independent of the operating panel, the image adjustment panel being disposed adjacent to the rotatable adjustment ring.

2. The projector according to claim 1, wherein the opening exposes the projection optical device.

3. The projector according to claim 1, wherein the image adjustment panel is disposed in a portion of the opening nearer the front surface.

4. A projector comprising:
an operating panel having a plurality of operating buttons which carry out various operations, is exposed in the external surface of an exterior housing;
a projection optical device configured to project an image light into which an incident luminous flux has been modulated in accordance with image information;
a rotatable adjustment ring configured to change the relative positions of a plurality of lenses configuring the projection optical device;
a projection position adjustment device configured to move the position of a projection image projected from the projection optical device; and
a projection position adjustment panel having projection position adjustment buttons which cause the projection position adjustment device to operate,
wherein:
an opening, which opens in one portion of the exterior housing and exposes the rotatable adjustment ring, is formed in the top surface of the exterior housing, and
the projection position adjustment panel is disposed adjacent the opening in a position independent of the operating panel.

5. The projector according to claim 4, wherein the opening exposes the projection optical device, and the projection position adjustment panel is disposed near the right side surface in relation to the opening.

6. The projector according to claim 4, wherein:
the projection position adjustment panel is disposed on a side of the opening opposite from the operating panel.

* * * * *